United States Patent
Kong et al.

(10) Patent No.: US 8,524,413 B2
(45) Date of Patent: Sep. 3, 2013

(54) MANIFOLD AND SOLID OXIDE FUEL CELL MODULE HAVING THE SAME

(75) Inventors: Sang-Jun Kong, Yongin-Si (KR); Duk-Hyoung Yoon, Yongin-Si (KR); Tae-Ho Kwon, Yongin-Si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 418 days.

(21) Appl. No.: 12/878,327

(22) Filed: Sep. 9, 2010

(65) Prior Publication Data

US 2011/0070517 A1 Mar. 24, 2011

(30) Foreign Application Priority Data

Sep. 18, 2009 (KR) .................. 10-2009-0088561

(51) Int. Cl.
*H01M 8/04* (2006.01)
*H01M 8/12* (2006.01)
*H01M 8/24* (2006.01)

(52) U.S. Cl.
USPC .......................................... 429/459; 429/466

(58) Field of Classification Search
None
See application file for complete search history.

(56) References Cited

U.S. PATENT DOCUMENTS

2004/0142223 A1   7/2004  Allen et al.
2010/0104911 A1*  4/2010  Ozaki et al. ............... 429/30

FOREIGN PATENT DOCUMENTS

| EP | 1909349 | * | 4/2008 |
|---|---|---|---|
| JP | 2005-216579 A | | 8/2005 |
| JP | 2006-032328 A | | 2/2006 |
| JP | 2009-043720 A | | 2/2009 |
| KR | 1020070022728 A | | 2/2007 |
| WO | WO 2009/008316 | * | 1/2009 |

* cited by examiner

*Primary Examiner* — Jonathan Crepeau
(74) *Attorney, Agent, or Firm* — Knobbe, Martens, Olson & Bear LLP

(57) ABSTRACT

A manifold for distributing and supplying a fluid to solid oxide fuel cell (SOFC) cells. The manifold may include at least one opening disposed at one side surface of a housing to allow the fluid to flow into the housing therethrough. A plurality of second openings are disposed at another side surface of the housing to allow the fluid to be discharged out from the housing therethrough. A porous member is disposed to partition an internal space of the housing between the first opening and the plurality of second openings. In the manifold, the porous member is formed so that the first opening ratio per unit area at a first portion positioned adjacent to the first opening varies with increasing distance toward a second portion positioned distant from the first opening.

11 Claims, 9 Drawing Sheets

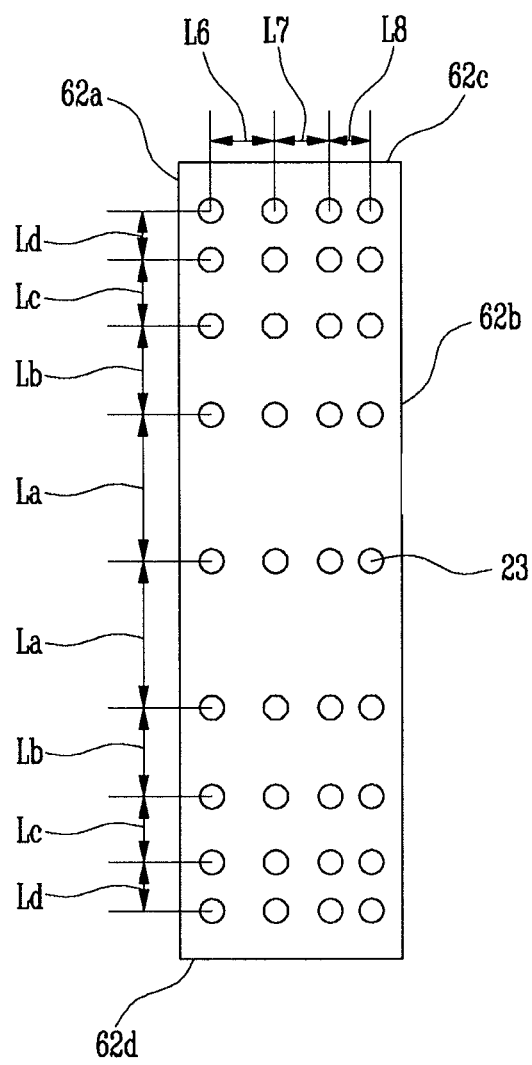

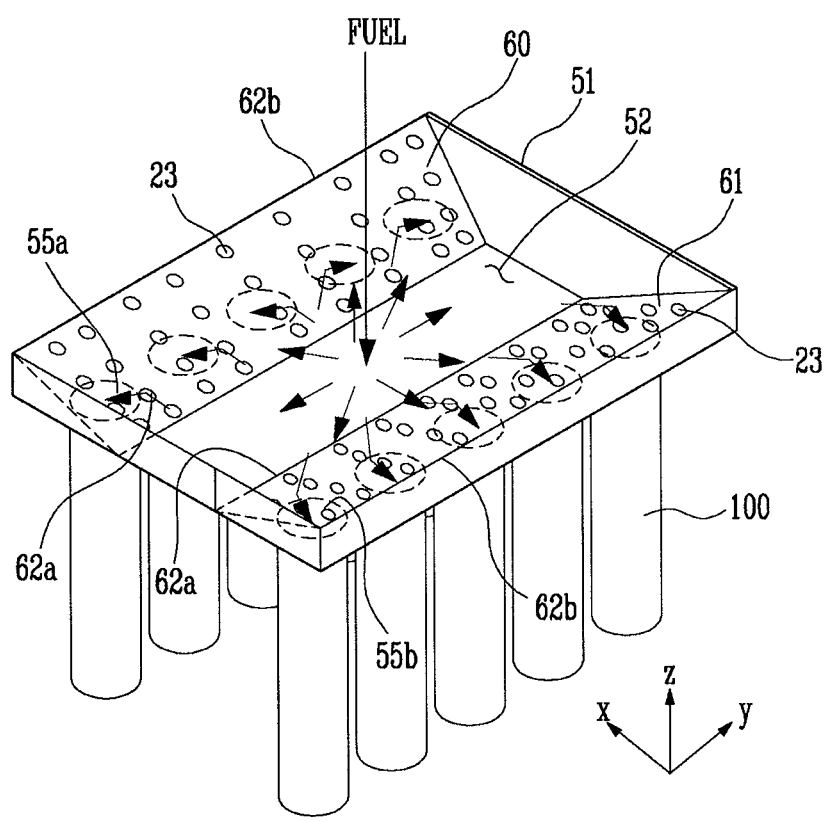

MANIFOLD AND SOLID OXIDE FUEL CELL MODULE HAVING THE SAME

CROSS-REFERENCE TO RELATED APPLICATION

This application claims the benefit of Korean Application No. 10-2009-0088561, filed in the Korean Intellectual Property Office on Sep. 18, 2009, the disclosure of which is incorporated herein by reference in its entirety.

BACKGROUND

1. Field

Aspects of the present invention relate to a manifold for distributing and supplying a fuel to solid oxide fuel cell (SOFC) cells and an SOFC module having the same.

2. Description of the Related Art

Solid oxide fuel cells (SOFCs) have advantages of no pollution, high-efficiency electric generation, and the like. The SOFCs are applied to stationary power generation systems, small independent sources, and vehicle power sources. An SOFC cell may be manufactured as a tube-type cell, a flat-tube-type cell, or the like. The tube-type or flat-tube-type SOFC cell may be manufactured to have a structure for a cathode-supported cell, a segmented-in-series cell, an anode-supported cell, or the like.

SOFCs having a desired output power, such as a rated output power of a few to a few hundreds of kilowatts (kW), may be manufactured via tube-type or flat-tube-type SOFC cells. A plurality of tube-type or flat-tube-type cells are generally manufactured into a bundle or module structure and then manufactured into a stack structure in which a plurality of bundles or modules are stacked or arranged.

SUMMARY

According to aspects of the present invention, there is provided a manifold capable of uniformly distributing and supplying a fuel or oxidizer to a plurality of solid oxide fuel cell (SOFC) cells for forming a bundle or module structure.

According to other aspects of the present invention, there is provided an SOFC module having the aforementioned manifold.

According to an aspect of the present invention, a manifold to distribute and supply a fluid to a plurality of SOFC cells is provided. The manifold includes a housing; at least one opening disposed at one side surface of the housing to allow the fluid to flow into the housing therethrough; a plurality of second openings disposed at another side surface of the housing to allow the fluid to be discharged out from the housing therethrough; and a porous member disposed to partition an internal space of the housing between the first opening and the plurality of second openings, wherein the porous member is formed with openings so that an opening ratio per unit area at a first portion positioned adjacent to the first opening varies with increasing difference toward a second portion positioned distant from the first opening.

According to another aspect of the present invention, the porous member includes a first porous member extending to and crossing a middle portion between the first opening and the plurality of second openings; and a second porous member disposed between the first porous member and the second openings to distribute the fluid passing through the first porous member into the plurality of second openings.

According to another aspect of the present invention, the opening ratio per unit area at the first porous member may change from the first portion to the second portion.

According to another aspect of the present invention, the opening ratio per unit area at the second porous member may be substantially constant.

According to another aspect of the present invention, the manifold may further include a guide wall to change the flow direction of the fluid passing through the first porous member toward the second porous member.

According to another aspect of the present invention, the manifold may further include a blocking wall to block the flow of the fluid, wherein the blocking wall is disposed opposite to the second porous member with the plurality of second openings interposed therebetween.

According to another aspect of the present invention, the plurality of second openings may be disposed in a line, and a direction of the second openings disposed in the line may be parallel with a direction of the fluid flowing into the housing through the first opening.

According to another aspect of the present invention, the plurality of second openings are disposed in a first row and a second row.

According to another aspect of the present invention, the porous member may include a first porous member disposed between the first row of second openings and the first opening, and a second porous member disposed between the second row of second openings and the first opening.

According to another aspect of the present invention, the first porous member may include first-first porous member and first-second porous member, disposed at a predetermined interval to sequentially face the first opening. The second porous member may include second-first porous member and second-second porous member disposed at a predetermined interval to sequentially face the first opening. One end of the first-first porous member and one end of the second-first porous member may be connected to each other to form a first sub-space to which the first opening is connected. One end of the first-second porous member and one end of the second-second porous member may be connected to each other to form a second sub-space surrounding the first sub-space.

According to another aspect of the present invention, the opening ratios per unit area at first portions of the first and second porous members positioned adjacent to each other, vary with increasing distance toward second portions of the respective first and second porous members, positioned distant from each other.

According to another aspect of the present invention, the first and second rows of second openings may open in a direction intersecting with the direction of the fluid flowed into the housing through the first opening, or in a direction parallel with the gravitational direction.

According to another aspect of the present invention, the first opening is formed at a cover covering a top opening of the housing, which is opposite to the first and second rows of second openings with the first and second porous members interposed therebetween.

According to another aspect of the present invention, the first and second porous members may be disposed opposite to each other while being surface-symmetrically inclined with respect to the flow direction of the fluid.

According to another aspect of the present invention, second sides of the first and second porous members, which are positioned distant from each other, may be disposed closer to the cover than first sides of the first and second porous members, which are positioned adjacent to each other.

According to another aspect of the present invention, the opening ratios per unit area at second portions adjacent to the second sides of the first and second porous members vary with increasing distance toward first portions adjacent to the first sides of the respective first and second porous members.

According to another aspect of the present invention, the porous member may include a perforated plate. The porous member may include at least one selected from the group consisting of a metal mesh, a plastic mesh, a sponge, and combinations thereof.

According to another aspect of the present invention, there is provided an SOFC module including a manifold according to any one of the aforementioned embodiments; and a plurality of tube-type cells respectively connected to the plurality of second openings of the manifold or at least one flat-tube-type fuel cell.

According to another aspect of the present invention, a plurality of tube-type cells or at least one flat-tube-type fuel cell is provided with a structure having a closed end. The tube-type cells may be respectively connected to the plurality of second openings of a manifold according to various aspects of the present invention.

According to aspects of the present invention, a fuel or oxidizer supplied to one side of a housing can be substantially distributed and supplied uniformly to a plurality of SOFC cells. Further, the performance of SOFC cells in an SOFC module can be unified, thereby improving the performance and stability of the SOFC module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a schematic view illustrating a porous member available for the manifold of FIG. 6.

FIG. 8 is a perspective view illustrating the operation of the manifold of FIG. 6.

DETAILED DESCRIPTION

Figure 1:
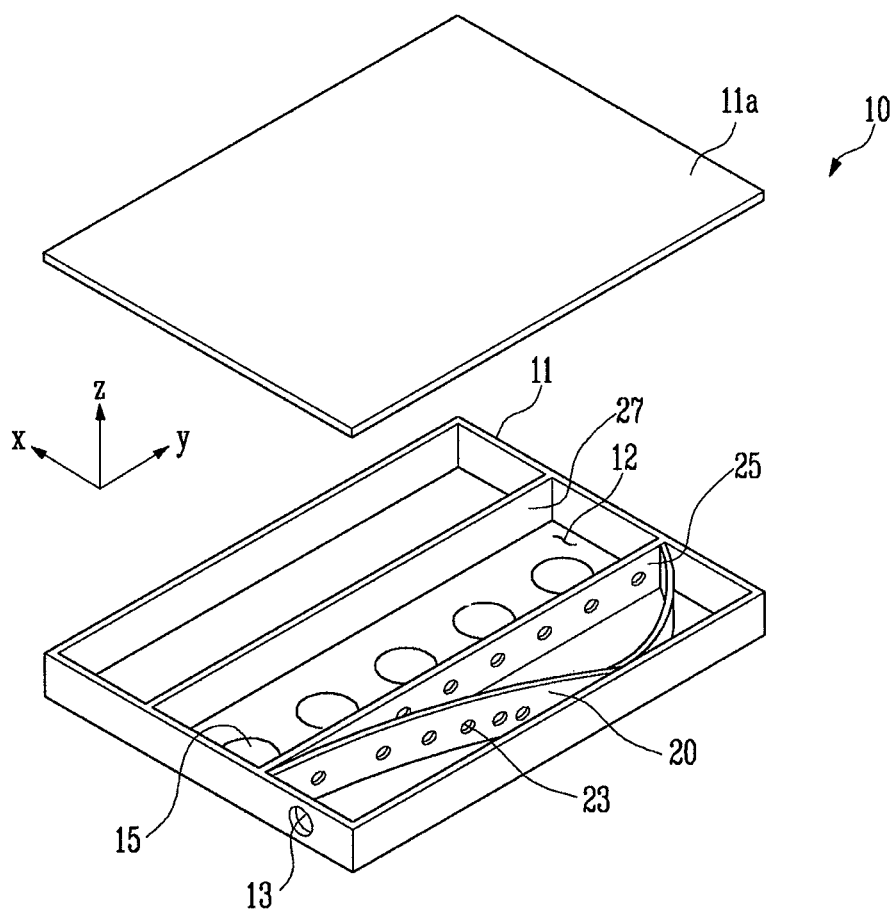
FIG. 1 is an exploded sectional view of a manifold according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween.

Figure 2A:
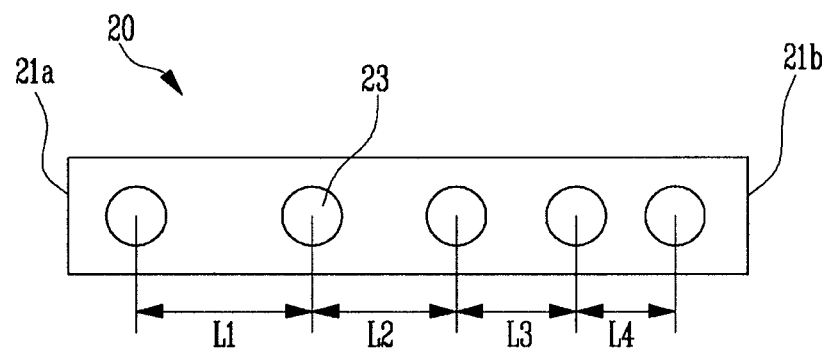
FIGS. 2A and 2B are schematic views illustrating porous members available for the manifold of FIG. 1.
Figure 2B:
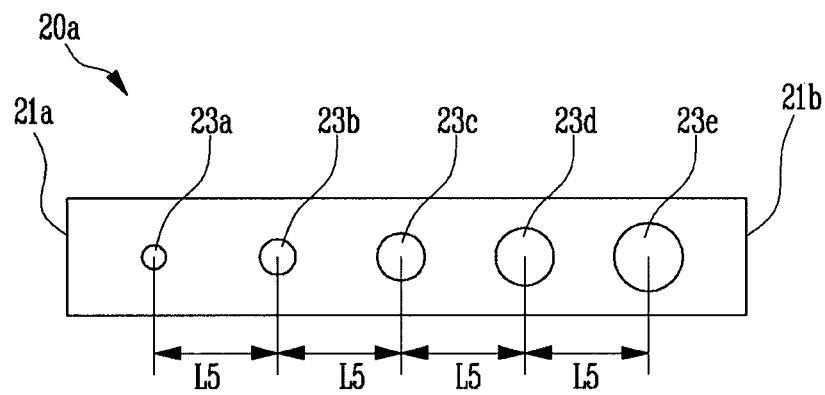

FIG. 1 is an exploded sectional view of a manifold 10 according to an embodiment of the present invention. FIGS. 2A and 2B are schematic views illustrating porous members 20, 20a available for the manifold 10. Referring to FIG. 1, the manifold 10 includes a housing 11 and a cover 11a covering the top opening of the housing 11. The housing 11 includes a first opening 13, a plurality of second openings 15, and porous members 20 and 25. The first opening 13 is provided at one side surface of the housing 11 to allow a fluid to flow into the housing 11 therethrough. The plurality of second openings 15 are provided at another side surface (e.g., a bottom surface being in contact with the one side surface) to allow the fluid to be discharged out from the housing 11 therethrough. The porous members 20 and 25 are disposed to partition an internal space 12 in the housing 11 between the first opening 13 and the plurality of second openings 15.

According to one aspect of the present invention, the plurality of second openings 15 is disposed in a line. The direction of the second openings 15 disposed in a line is parallel with that of the fluid flowing into the housing 11 through the first opening 13. However, aspects of the present invention are not limited thereto.

According to another aspect of the present invention, the porous members 20 and 25 include a main porous member 20 (hereinafter, referred to as a first porous member) disposed to extend while crossing a middle portion between the first opening 13 and the second openings 15, and an auxiliary porous member 25 (hereinafter, referred to as a second porous member) to distribute and supply the fluid passing through the first porous member 20 to the second openings 15.

The first porous member 20 is disposed to allow a first wall of the housing 11, at which the first opening 13 is formed, to be connected to a second wall adjacent to the first wall therethrough. The first porous member 20 is provided with a sub-space defined by the first and second walls. The first opening 13 is provided at one side of the sub-space. The first porous member 20 is provided to be slightly inclined with respect to the direction of a fuel or oxidizer flowing into the housing 11 through the first opening 13.

Thus, the fluid flowing into the housing 11 under a predetermined pressure has different space velocities at a portion positioned adjacent to the first opening 13 as compared to a portion positioned distant from the first opening 13. Such a difference in space velocities may be used to allow the fuel to be effectively distributed in the internal space 12 in accordance with the porosity or opening ratio of the first porous member 20.

The first porous member 20 has a plurality of holes 23. The first opening ratio of holes 23 per unit area at a first portion positioned adjacent to the first opening 13 is different from the second opening ratio per unit area at a second portion positioned distant from the first opening 13. In this case, the fuel or oxidizer supplied to the housing 11 under a predetermined pressure through the first opening 13 may have different fluid velocities or pressures in accordance with the opening ratio or porosity at each portion of the first porous member 20.

For example, according to one aspect of the present invention as illustrated in FIG. 2A, the first porous member 20 has an end portion 21a connected to the first wall of the housing 11, at which the first opening 13 is formed, and another end portion 21b windingly extends from one portion of the first wall to be connected to the second wall of the housing 11. The opening ratio near the one end portion 21a is different from that near the other end portion 21b.

The first porous member 20 is provided with holes 23 having substantially the same size. The holes 23 may be formed so that the average interval between holes 23 gradually decreases from the one end portion 21a to the other end portion 21b. The intervals L1, L2, L3 and L4 between the holes 23 have a relationship of L1>L2>L3>L4. In this case, the opening ratio per unit at the first porous member 20 may gradually increase from the first portion in the vicinity of the one end portion 21a to the second portion in the vicinity of the other end portion 21b.

According to another aspect of the present invention shown in FIG. 2B, a first porous member 20a may be provided with holes 23a, 23b, 23c, 23d and 23e having different sizes and the substantially same interval L5. As illustrated in FIG. 2B, the sizes of first, second, third, fourth and fifth holes 23a, 23b, 23c, 23d and 23e have a relationship where a size of the first hole 23a<a size of the second hole 23b<a size of the third hole 23c<a size of the fourth hole 23d<a size of the fifth hole 23e. In this case, the opening ratio per unit area at the first porous member 20a may gradually increase from the first portion in the vicinity of the one end portion 21a to the second portion in the vicinity of the other end portion 21b.

While not required in all aspects, the shown manifold 10 is provided with a guide wall 26 to change or reflect the flow direction of the fluid passing through the first porous member 20 in the internal space 12 toward the second porous member 25. The guide wall 26 is connected between the second wall of the housing 11 and a third wall extending opposite to the first wall from the second wall of the housing 11. The guide wall 26 is provided to form a space surrounded by the second and third walls of the housing 11 and the first and second porous members 20 and 25.

According to the aforementioned configuration, the fluid flowing into the housing 11 in a first direction (y-direction) through the first opening 13 is substantially spread and distributed in a second direction (x-direction) perpendicular to the first direction by the guide wall 26 so as to flow toward the second openings 15.

The fluid spread and distributed in the second direction is uniformly distributed while passing through the second porous member 25 so as to be supplied to the second openings 15. The second porous member 25 is positioned between the first porous member 20 and guide wall 26 and the second openings 15. The second porous member 25 is disposed to additionally partition the internal space 12. The opening ratio per unit area at the second porous member 25 may be substantially uniform. Thus, the second porous member 25 may be formed so that holes having a substantially uniform size are disposed at a uniform interval. However, the invention is not limited thereto.

While not required in all aspects, the shown manifold 10 is further provided with a blocking wall 27 to prevent fluids passing through the second porous member 25 from flowing toward other portions in the internal space 12. The blocking wall 27 is disposed to be opposite to the second porous member 25 with the second openings interposed therebetween.

According to an aspect of the present invention, the first and second porous members 20 and 25 may be formed as a perforated plate. In this case, holes of the perforated plate may be formed to have a uniform slope with respect to the thickness direction of the perforated plate or to have different slopes, depending on the flow direction of the fluid. According to another aspect of the present invention, the first or second porous member 20 or 25 may be formed of any one selected from the group consisting of a metal mesh, a plastic mesh, a sponge, or a combination thereof.

Figure 3A:
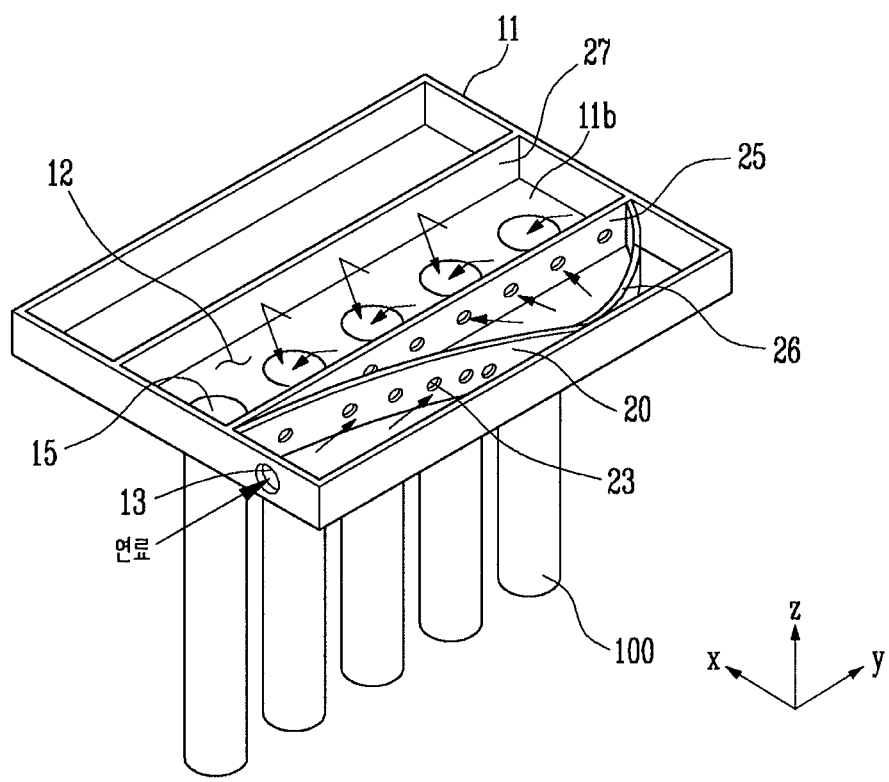
FIGS. 3A and 3B are perspective views illustrating the operation of the manifold of FIG. 1.
Figure 3B:
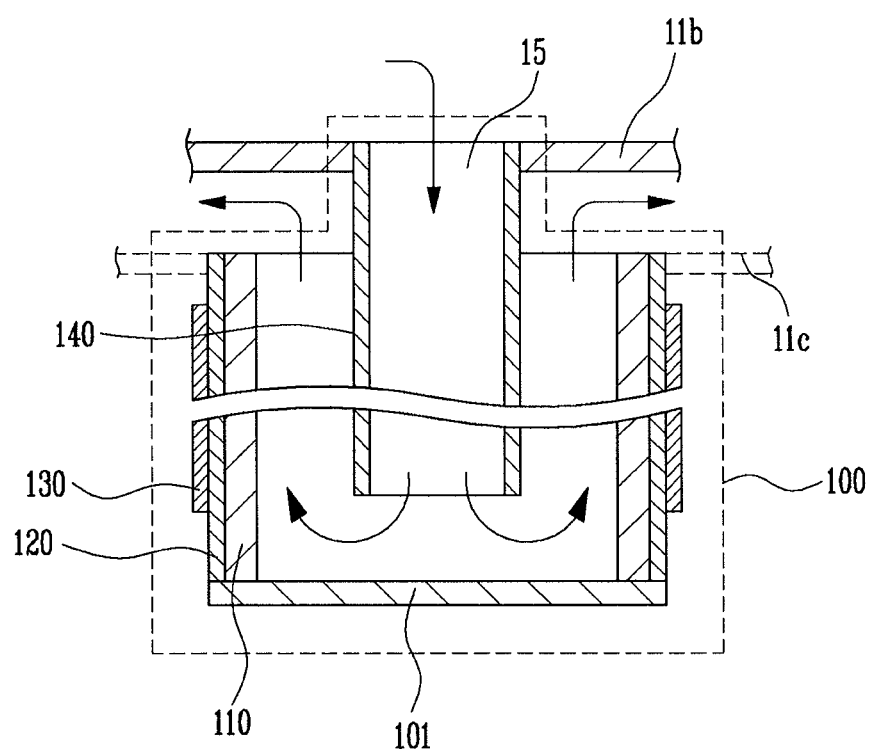

FIGS. 3A and 3B are perspective views illustrating the operation of the manifold of FIG. 1. Referring to FIG. 3A, the manifold 10 is connected to a plurality of tube-type cells 100 so as to supply a fuel or oxidizer to the plurality of cells 100. The plurality of cells 100 are respectively connected to the second openings 15 of the manifold 10, thereby forming a fuel cell module.

If a fluid (such as the fuel or oxidizer) is supplied in the first direction (y-direction) through the first opening 13 of the manifold 10, the fluid is primarily spread and distributed toward directions between the first direction and the second direction (x-direction) while passing through the first porous member 20 provided inclined with respect to the flow direction of the fluid (i.e., the first direction). At this time, most of the fluid passes through the first porous member 20 under the flow pressure of the fluid and then collides against the guide wall 26. The fluid colliding against the guide wall 26 is roughly refracted or reflected in the second direction.

The fluid is distributed in the second direction while the flow direction of the fluid is changed from the first direction to the second direction by the first porous member 20 and the guide wall 26. The fluid then passes through the second porous member 25 and is supplied to the cells 100 through the second openings 15.

Referring to FIG. 3B, the fluid supplied to each of the cells 100 is supplied to the innermost portion of each of the cells 100 through a pipe 140 deeply inserted into a hollow portion of each of the cells 100 and is then discharged out through a channel formed adjacent to a bottom wall 11b of the manifold 10 by flowing backward from the hollow portion of each of the cells 100 along the outer surface of the pipe 140. The channel may be formed by a housing 11c of another manifold, positioned adjacent to the bottom wall 11b of the manifold 10. Practically, each of the cells 100 is provided with another manifold including a structure having a closed end by a cap or cover 101. Each of the cells 100 is connected to the manifold 10 through the pipe 140.

Each of the cells 100 includes a first electrode 110, a second electrode 130, and an electrolyte layer 120 positioned between the first and second electrodes 110 and 130. The electrolyte layer 120 is formed of an ion conducting oxide for transporting oxygen ions or protons. In each of the cells 100, the first electrode 110 may be formed as a tubular anode support or tubular cathode support. Each of the cells 100 may be additionally provided with a separate tubular support.

Each of the cells 100 generates electricity though an electrochemical reaction of a fuel and an oxidizer, respectively supplied to the first and second electrodes 110 and 130. The fuel may include methane, propane, butane, and the like, which are reformed in each of the cells 100 to form a reformate containing abundant hydrogen. The oxidizer may include may include oxygen in the air, pure oxygen gas and the like.

Figure 4:
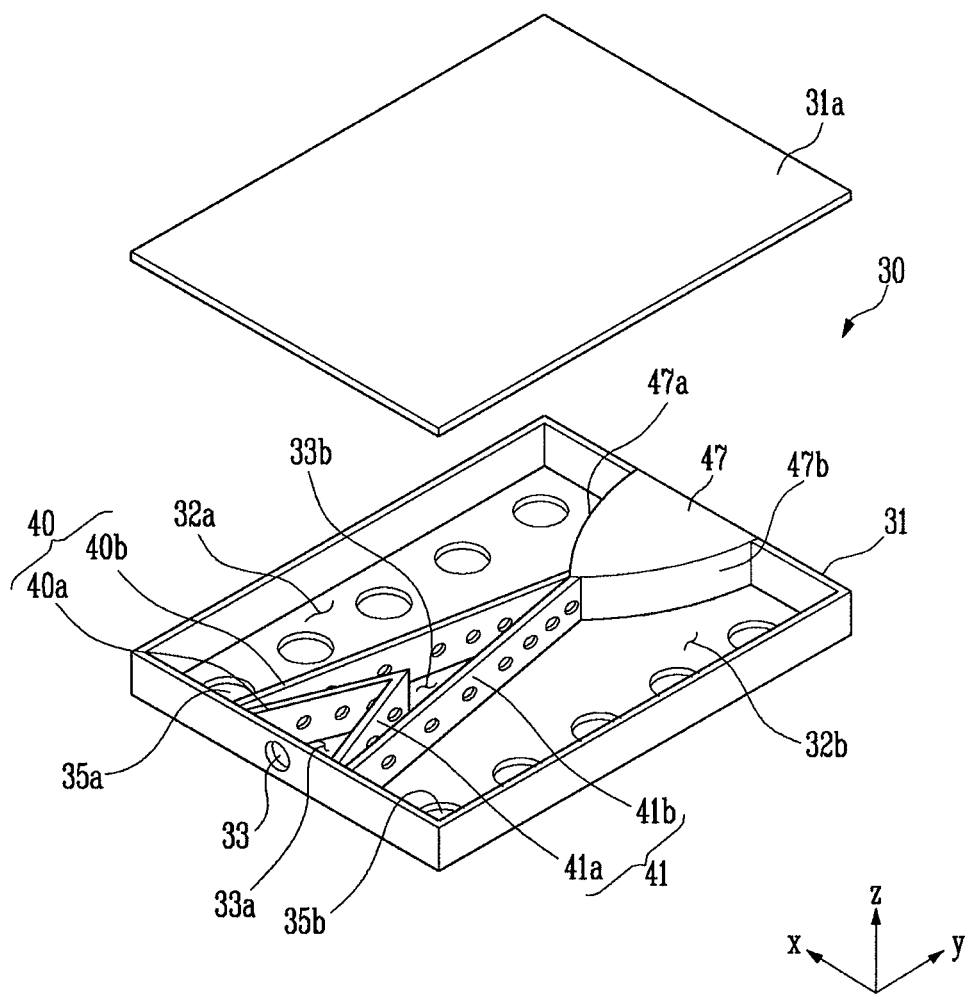
FIG. 4 is an exploded sectional view of a manifold according to another embodiment of the present invention.

FIG. 4 is an exploded sectional view of a manifold 30 according to another embodiment of the present invention. Referring to FIG. 4, the manifold 30 includes a housing 31 and a cover 31a covering the top opening of the housing 31. The housing 31 may be provided with the cover 31a. The housing 31 includes at least one first opening 33, a plurality of second openings 35a and 35b, and porous members 40 and 41. The at least one first opening 33 is provided at one side surface of the housing 31 to allow a fluid to flow into the housing 31 therethrough. The plurality of second openings 35a and 35b are provided at another side surface (e.g., a bottom surface being in contact with the one side surface) to allow the fluid to be discharged out from the housing 31 therethrough. The porous members 40 and 41 are disposed to partition internal spaces 32a and 32b and/or sub-spaces 33a and 33b between the first opening 31 and the plurality of second openings 35a and 35b.

According to an aspect of the present invention, the plurality of second openings 35a and 35b include a first row of second openings 35a and a second row of openings 35b, which extend in a first direction (−z-direction). The first row of second openings 35a and the second row of second openings 35b may be formed in any direction intersecting with the direction (y-direction) of the fluid flowed into the housing 31 through the first opening 33, for example, a direction (−z-direction) parallel with the gravitational direction.

The porous members 40 and 41 include first porous members 40a and 40b and second porous members 41a and 41b. The first porous members 40a and 40b are disposed between the first row of second openings 35a and the first opening 33. The second porous members 41a and 41b are disposed between the second row of second openings 35b and the first opening 33.

The first porous members 40a and 40b include a first-first porous member 40a and a first-second porous member 40b, disposed at a predetermined interval to sequentially face the first opening 33 while being slightly inclined with respect to the direction of the fluid flowed into the housing 31 through the first opening 33. The second porous members 41a and 41b include a second-first porous member 41a and a second-second porous member 41b, disposed at a predetermined interval to sequentially face the first opening 33 while being slightly inclined with respect to the direction of the fluid flowed into the housing 31 through the first opening 33.

One end of the first-first porous member 40a and the second-first porous member 41a are connected to each other to form a first sub-space 33a connected to the first opening 33 from one side thereof. Similarly, one end of the first-second porous member 40b and the second-second porous member 41b are connected to each other to form a second sub-space 33b surrounding the first sub-space 33a toward the first opening 33 in the housing 31.

The first-second porous member 40b is provided to allow the second sub-space 33b to be partitioned from the first internal space 32a connected to the first row of second openings 35a in the housing 31. The second-second porous member 41b is provided to allow the second sub-space 33b to be partitioned from the second internal space 32b connected to the second row of second openings 35b in the housing 31.

According to an aspect of the present invention, the opening ratios per unit area at first portions of the first and second porous members 40 and 41, positioned adjacent to each other, are greater than those at second portions of the first and second porous members 40 and 41, positioned distant from each other, respectively (see FIGS. 2A and 2B). For example, the first and second porous members 40 and 41 may be formed as a perforated plate. In this case, holes of the perforated plate may be formed to have a uniform slope with respect to the thickness direction of the perforated plate or to have different slopes, depending on the flow direction of the fluid. According to another aspect of the present invention, the first or second porous member 40 or 41 may be formed of any one selected from the group consisting of a metal mesh, a plastic mesh, a sponge and a combination thereof.

The manifold 30 may be provided with a protruding portion protruding toward the first opening 33 from the second wall of the housing 31, opposite to the first wall having the first opening 33. One end of the protruding portion 47 is in contact with the first-second porous member and second-second porous members 40b and 41b. Outer surfaces 47a and 47b of the protruding portion 47 guide the fluid passing through the first-second porous member and second-second porous member 40b or 41b toward the second openings 35a or 35b while forming one surfaces of the first and second internal, spaces 32a and 32b, respectively.

Figure 5:
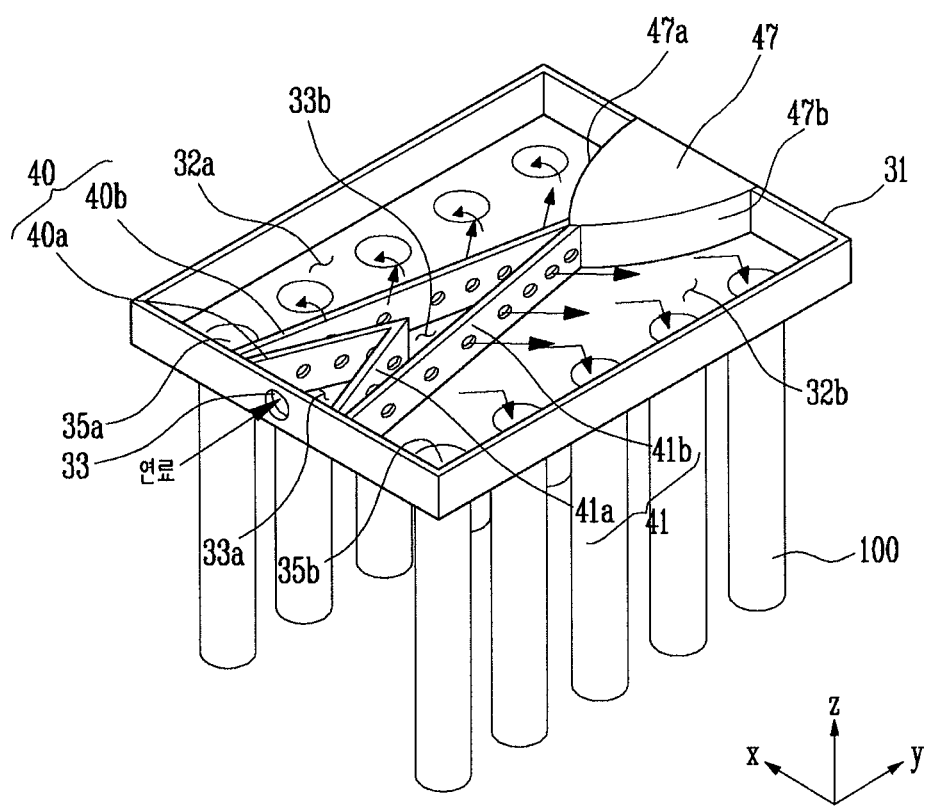
FIG. 5 is a perspective view illustrating the operation of the manifold of FIG. 4.

FIG. 5 is a perspective view illustrating the operation of the manifold of FIG. 4. Referring to FIG. 5, an external fluid (e.g., a fuel or oxidizer) flows into the first sub-space 33a through the first opening 33 and then passes through the first-first and second-first porous members 40a and 41a in the first sub-space 33a to the second sub-space 33b. The fluid then moves to the first internal space 32a by passing through either the first-second porous member 40b in the second sub-space 33b or the second-second porous member 41b in the second sub-space 33b.

At this time, the flow direction of the fluid passing through the first and second porous members 40 and 41 is gradually broadly distributed from the first direction (y-direction) to second directions (x-direction and −x-direction) in which the first and second rows of second openings 35a and 35b are respectively arranged under the pressure of the flowed fluid. A portion of the fluid collides against the outer surfaces 47a and 47b and roughly flows in the second directions under the pressure of the flowed fluid.

As described above, the flow of the fluid flowing into the housing 31 through only the first opening 33 can be roughly spread and changed in its perpendicular direction and then discharged out through the plurality of second openings 35a and 35b.

Figure 6:
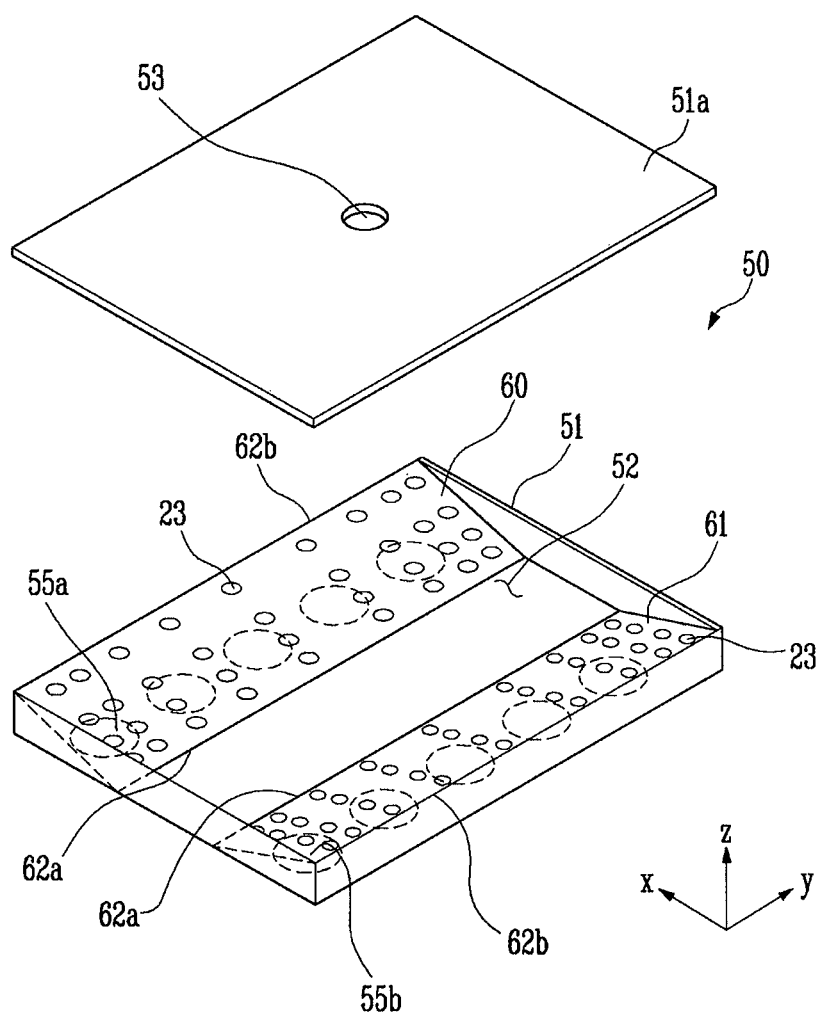
FIG. 6 is an exploded perspective view of a manifold according to still another embodiment of the present invention.

FIG. 6 is an exploded perspective view of a manifold 50 according to still another embodiment of the present invention. FIG. 7 is a schematic view illustrating a porous member 60, 61 available for the manifold 50 of FIG. 6. Referring to FIG. 6, the manifold 50 includes a housing 51 and a cover 51a for covering the top opening of the housing 51. The cover 51a is provided with at least one first opening 53 through which a fluid flows into the housing 51. The housing 31 includes a plurality of second openings 55a and 55b and first and second porous members 60 and 61. The plurality of second openings 55a and 55b are provided at one side surface (e.g., a bottom surface opposite to the cover 51a) to allow the fluid to be discharged out from the housing 51 therethrough. The first and second porous members 60 and 61 are disposed to partition an internal space 52 of the housing 51 between the first opening 53 and the plurality of second openings 55a and 55b.

The plurality of second openings 55a and 55b include a first row of second openings 35a and a second row of second openings 35b as showed in FIG. 5, formed in the first direction (−z-direction) from a bottom surface of the housing 51.

According to an aspect of the present invention, the first porous member 60 is disposed inclined with respect to the direction (−z-direction) of the fluid flowing into the housing 51 through the first opening 53. The second porous member 61 is disposed inclined with respect to the direction of the fluid flowed into the housing 51 through the first opening 53. For example, first sides 62a of the first and second porous members 60 and 61 are disposed opposite to each other at the bottom surface of the housing 51. Second sides 62b of the first and second porous members 60 and 61, positioned distant from each other, are disposed closer to the cover 51a having the first opening 53 than the first sides 62a positioned adjacent to each other. The first and second porous members 60 and 61 are disposed opposite to each other while being surface-symmetrically inclined.

The opening ratios per unit area at second portions adjacent to the second sides 62b of the first and second porous members 60 and 61 are greater than those at first portions adjacent to the first sides 62a of the first and second porous members 60 and 61, respectively.

For example, as illustrated in FIG. 7, the first or second porous member 60 or 61 may be formed so that the average interval between holes 23 having the same size gradually decreases from the first side 62a to the second side 62b. The intervals L6, L7 and L8 between the holes 23 in the direction from the first side 62a to the second side 62b have a relationship of L6>L7>L8. The first or second porous member 60 or 61 may be formed so that the average interval between the holes 23 gradually decreases from the center portion between third and fourth sides 62c and 62d to the third or fourth side 62c or 62d. The intervals La, Lb, Lc and Ld between the holes 23 in the direction from the third side 62c to the fourth side 62d have a relationship of La>Lb>Lc>Ld.

FIG. 8 is a perspective view illustrating the operation of the manifold of FIG. 6. Referring to FIGS. 6 and 8, an external fluid (e.g., a fuel) flows into the internal space 52 in the first direction (−z-direction) through the first opening 53 and roughly spread radially from the first direction. The spread fluids then flow toward the first and second rows of second openings 55a and 55b by passing through the first and second porous members 60 and 61, respectively.

The direction of the fluid flowing into the housing 51 through the first opening 53 is spread and refracted radially from the first direction (−z-direction) at the bottom surface of the housing 51 and then refracted again in the first direction while passing through the first and second porous members 60 and 61. The fluids respectively passing through the first and second porous members 60 and 61 are discharged out through the first and second rows of second openings 55a and 55b while being distributed by different opening ratios per unit area at first and second porous members 60 and 61, respectively.

Figure 9A:
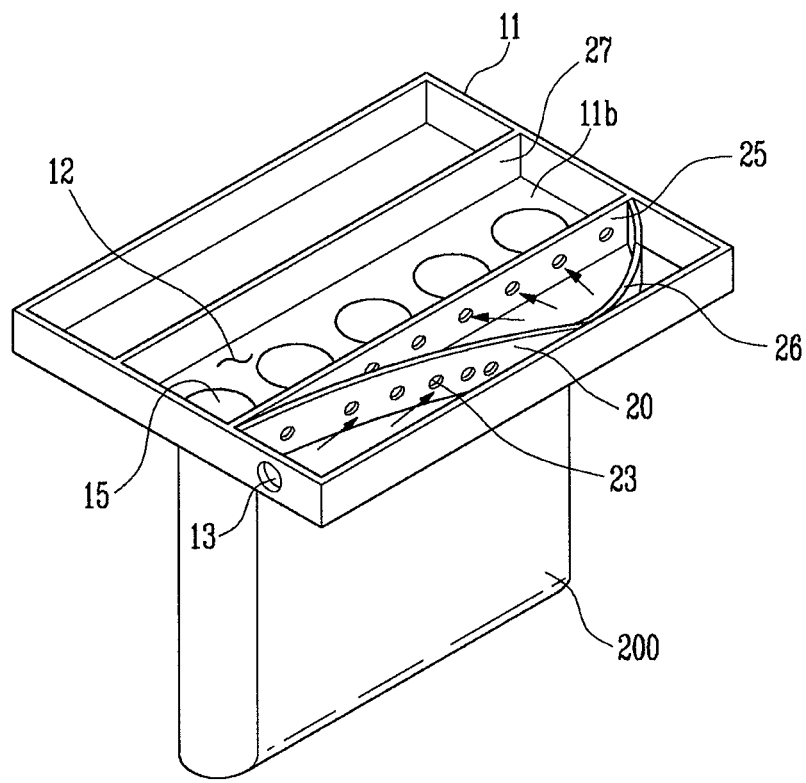
FIG. 9A is a perspective view illustrating a solid oxide fuel cell (SOFC) available for the manifold of FIG. 1.
Figure 9B:
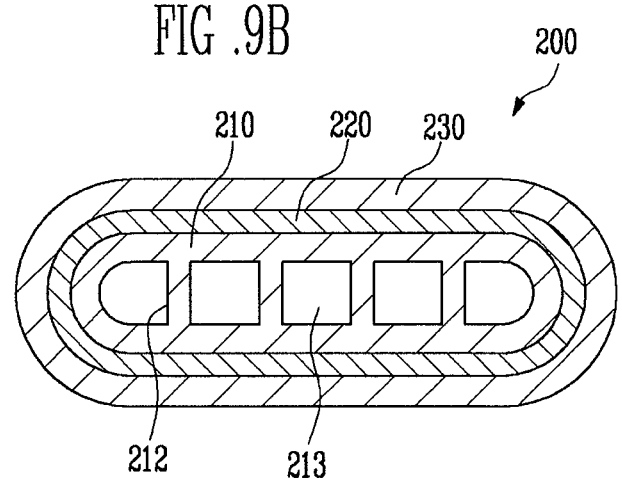
FIG. 9B is a sectional view illustrating the SOFC of FIG. 9A.

FIG. 9A is a perspective view illustrating an SOFC available for the manifold 10 of FIG. 1. FIG. 9B is a sectional view illustrating the SOFC of FIG. 9A. Referring to FIG. 9A, a flat-tube-type SOFC cell 200 is connected to the plurality of second openings 15 provided to the manifold of FIG. 1.

According to one aspect of the present invention, as illustrated in FIG. 9B, the flat-tube-type SOFC cell 200 includes a first electrode 210 to form a flat tubular support, an electrolyte layer 220, and a second electrode 230. The electrolyte layer 220 and the second electrode 230 are sequentially stacked on the outer surface of the first electrode 210. A hollow portion 213 of the first electrode 210 is partitioned into a plurality of hollow portions by partition walls 212 integrally formed with the first electrode 210. In this case, the number of partitioned hollow portions may be identical to that of the aforementioned second openings 15, and the hollow portions may be connected to correspond to the second openings 15, respectively.

According to one aspect of the present invention, the flat-tube-type SOFC cell connected to the second openings 15 of the manifold may be provided with a structure having a closed end, like the tube-type SOFC cell illustrated in FIG. 3B.

According to aspects of the present invention, there can be provided an SOFC module having the manifold 10, 30, or 50 and a plurality of tube-type cells respectively connected to a plurality of second openings of the manifold or at least one flat-tube-type cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A manifold to distribute and supply a fluid to a plurality of solid oxide fuel cells (SOFC), the manifold comprising:
   a housing;
   at least one opening disposed at one side surface of the housing to allow the fluid to flow into the housing therethrough;
   a plurality of second openings disposed at another side surface of the housing to allow the fluid to be discharged out from the housing therethrough; and
   a porous member disposed to partition an internal space of the housing between the first opening and the plurality of second openings,
   wherein the porous member is formed with openings so that an opening ratio per unit area at a first portion positioned adjacent to the first opening varies with increasing distance toward a second portion positioned away from the first opening, and wherein the porous member comprises a first porous member extending to and crossing a middle portion between the first opening and the plurality of second openings and a second porous member disposed between the first porous member and the second openings, to distribute the fluid passing through the first porous member into the plurality of second openings.

2. The manifold according to claim 1, wherein the opening ratio per unit area at the first porous member changes from the first portion to the second portion.

3. The manifold according to claim 2, wherein the opening ratio per unit area at the second porous member is substantially constant.

4. The manifold according to claim 1, further comprising a guide wall to change a flow direction of the fluid passing through the first porous member toward the second porous member.

5. The manifold according to claim 4, further comprising a blocking wall to block the flow of the fluid, wherein the blocking wall is disposed opposite to the second porous member with the plurality of second openings interposed therebetween.

6. The manifold according to claim 1, wherein the plurality of second openings are disposed in a line, and a direction of the second openings disposed in the line is parallel with a direction of the fluid flowing into the housing through the first opening.

7. The manifold according to claim 1, wherein the plurality of second openings open in a direction intersecting with the direction of the fluid flowing into the housing through the first opening, the direction in parallel with the gravitational direction.

8. The manifold according to claim 1, wherein the porous member comprises a perforated plate.

9. The manifold according to claim 1, wherein the porous member includes at least one selected from the group consisting of a metal mesh, a plastic mesh, a sponge, and combinations thereof.

10. A solid fuel oxide cell (SOFC) module, comprising:
    a manifold according to claim 1; and
    a plurality of tube-type cells respectively connected to the plurality of second openings of the manifold.

11. A solid fuel oxide cell (SOFC) module, comprising:
a manifold according to claim 1; and
a plurality of flat-tube-type cells, each respectively connected to the plurality of second openings of the manifold.

* * * * *